Patented Aug. 16, 1927.

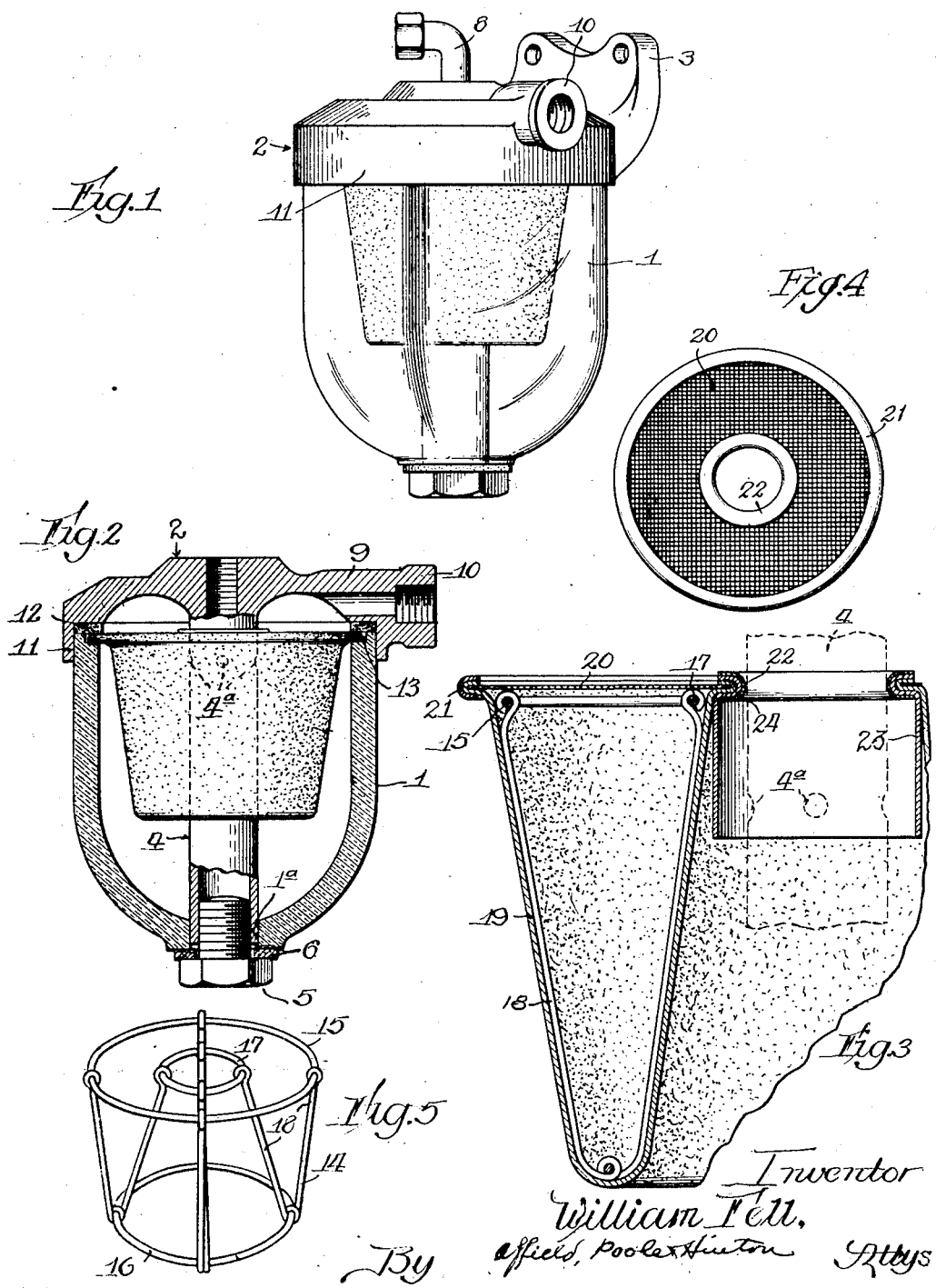

1,639,170

UNITED STATES PATENT OFFICE.

WILLIAM FELL, OF CHICAGO, ILLINOIS, ASSIGNOR TO VISIBLE GASOLINE FILTER COMPANY, OF CHICAGO, ILLINOIS, A CORPORATION OF ILLINOIS.

GASOLINE FILTER.

Application filed December 10, 1920. Serial No. 429,607.

This invention relates to improvements in gasoline filters, particularly designed to be introduced into the gasoline feed line of a motor vehicle, intermediate the carburetor and source of gasoline supply, for the manifest purpose of removing foreign matter and impurities from the gasoline.

A gasoline filter embodying the general features of construction herein to be set forth, has been the subject matter of prior applications filed by me in the United States Patent Office, to-wit: Serial Nos. 321,748 and 327,063.

The object of the present invention is to provide an improved and more practical construction for a filter, the novel features pertaining more especially to the construction and arrangement of the filtering medium, which experience has shown is the vital part of a filtering apparatus, not only from the standpoint of satisfactory performance, but from the standpoint of increasing the service secured from the material used in the filtering medium. A further object of the invention is to provide a construction for the filter and its filtering medium whereby the replacement of the latter may be accomplished readily, and without the service of an experienced person. This end has been primarily accomplished by providing a filtering medium which is constructed as a separate unit of the device, and capable of removal and replacement without disturbing the conformation or condition of the filtering material.

The novel features thus described in a general way are hereinafter brought out in detail, and in connection with the accompanying drawings, in which Fig. 1 is a view in elevation of the complete device, Fig. 2 is a view of the device in vertical section, Fig. 3 is an enlarged view in vertical section of the filtering unit, showing the details of construction thereof, Fig. 4 is a top plan view of the filtering unit, and Fig. 5 is a perspective view of the skeleton frame of the filtering unit.

A filter embodying the invention comprises, in general, a receptacle provided with inlet and discharge passages, and a filtering medium within the receptacle, the inlet and discharge passages so connected to a pipe line conducting the gasoline to the carburetor of the motor, that the unfiltered gasoline enters the receptacle on one side of the filtering medium, passes through the filtering medium, and from the receptacle through the discharge passage.

Referring to the construction herein disclosed, the receptacle comprises a cylindric body portion 1, preferably made of glass, and resembling somewhat a jar open at its top and rounded at its bottom or lower end. The body member or jar 1 depends from an annular plate or cap member 2, provided with an integral bracket 3 by means of which the device may be mounted in vertical position upon the dashboard or other part of the motor vehicle. The inlet and discharge passages hereinbefore referred to, preferably form an integral part of the cap 2, the inlet passage having the form of a vertical tube or tubular stem 4 extending downwardly from the under side of the cap 2, and axially thereof, the lower end of said stem being adapted to extend through an aperture 1ª at the lower end of the body member 1. The cap member 2 and the body member 1 are detachably connected in the following manner: The lower end of the stem 4 which terminates substantially flush with the bottom surface of the body member is tapped to receive the threaded shank of a screw 5, adapted to be screwed upwardly against a washer 6, which in turn bears against the bottom of the body member 1. The vertical passage of the tubular stem 4 extends upwardly through the cap member 2 and communicates with an elbow 8, to which is connected the inlet side of the gasoline feed pipe by means of a suitable coupling. The discharge passage 9 is formed integral with the cap member 2, and extends horizontally and radially a short distance beyond the periphery thereof, there being provided a suitable threaded connection at the end of the passage adapted to be connected to the discharge side of the gasoline feed line, whereby the same communicates directly with the upper portion of the receptacle.

Referring more in detail to the internal structure of the device, and the filtering unit in particular, the annular edge of the body member fits within a flange 11 surrounding the periphery of the cap member 2, a gasket 12 being inserted between the edge of the body member and the under surface of the cap member. In addition to the parts described, an annular groove 13 is formed in the upper edge of the body member 1, this groove forming an inwardly facing shoulder co-operating with the gasket 12 to form an annular space to be engaged by the filtering unit in a manner to be described.

As clearly shown in the drawings, the filtering unit partakes of the general shape of a ring, a section of which presents the conformation of an inverted cone. In general, the filtering medium consists of a skeleton frame 14 made up of wire or other suitable material, and preferably consisting of a large annular ring 15, Figures 3 and 5, at its upper end, a ring 16 at its lower end, having somewhat less diameter than the ring 15, and a small ring 17 located in the plane of and in concentric relation with the large ring 15. Connecting the rings; that is to say, the lower ring 16 with the upper rings 15 and 17, is a plurality of V-shaped pieces of wire 18 which complete the frame and forms a comparatively rigid structure adapted to be inserted into an otherwise flexible structure comprising a layer of chamois 19 of circular shape in the flat, which is initially treated in the following manner:

The outer edges of the chamois 19 is secured to the edges of a circular piece of relatively non-flexible material, such as wire mesh screen 20, by means of a metallic binding ring 21. The edges of a central aperture formed in said chamois are likewise bound to the edges of a corresponding aperture in the wire screen by means of a similar binding ring 22. Secured at this latter point, and forming an integral part of the filtering unit is a cylindric baffle member 23 depending from the central opening, and secured in place by the provision of an inwardly bent flange 24 at its upper end, and adapted to be included by the binding ring 22, as clearly shown in Figure 3. This cylindric baffle, which serves a purpose hereinafter to be brought out, is located within the inner conical wall portion of the channels, and forces the same away from the tubular stem 4, which will be seen extends through the central opening at the upper end of the filtering unit. The frame 14, conforming as it does to the final shape of the chamois, is inserted within the same manifestly before the sealing of its edges to the wire screen, as above described, thus introducing the desired degree of tautness in the chamois, as well as determining the permanent conformation thereof, and imparting the desired rigidity into the whole unitary structure of the filtering unit.

In assembling the filter, the filtering unit is inserted into the body member, the annular flange formed in part by the ring 21 engaging the groove 13 in the upper margin of the body member. The parts thus far assembled are applied to the cap member 2 by passing the stem 4 downwardly through the central opening in the filtering unit, and applying the screw 5, the parts are drawn tightly together and the device is ready for operation. Similarly, in disassembling the device for the purpose of renewing the filtering unit or for removing the foreign matter at the bottom of the receptacle, it is only necessary to remove the screw 5, whereupon the body member 1 and the filtering unit will become detached.

The manner in which the device functions is manifest, the gasoline being fed into the device through the inlet passage, and downwardly through the tubular stem, where it is discharged into the receptacle and below the filtering medium through a series of openings 4ª in the stem immediately adjacent to the baffle member 23. The gasoline in passing through these openings comes into contact with the baffle member, and is diverted in a downwad direction, this tending to promote circulation within the lower part of the receptacle, to the end that the entire area of the chamois is utilized and a more complete filtration produced. The filtration is manifestly in an upward direction from the lower to the upper part of the receptacle, the liquid passing through the chamois obliquely to the general direction of movement. Having passed through the chamois, the liquid is discharged through the passage, and is conducted to the carburetor of the motor.

The advantage of a filter constructed in the manner described resides chiefly in the arrangement of the filtering unit, this advantage having been heretofore alluded to in a general way, although it may again be pointed out that several essential results are accomplished. First, by utilizing the particular conformation disclosed, the maximum area of filtering surface is procured, thus promoting rapidity in filtration, and increased life of the filtering material. Secondly, the construction of the filtering unit as a separate member of the device permits these parts to be readily handled and sold on the market for replacement purposes by having that degree of rigidity which permits them to be handled without danger and injury, and lastly, the filtering mediums may be easily and quickly removed and a new one inserted without loss of time, and without necessitating any adjustment such as stretching of the chamois or securing of the same within the receptacle, all of which would tend to introduce the element of uncertainty in the performance of the device, and the results which are sought to be obtained.

Having described a structure embodying the features of the invention, I claim:

1. In a filter, the combination of a receptacle, having inlet and outlet connections, a filtering unit removably mounted in said receptacle and comprising a skeleton frame, a disc of relatively stiff material at one end of said frame, and provided with a central aperture, a screen of pliable filtering material fitting tightly over said frame with its edges secured inwardly from the margin of said disc to provide a marginal flange adapted to support said unit in said receptacle. and a tubular extension communicating with one of said connections and extending into said receptacle for registering with the aperture in said disc.

2. In a filter of the character described. the combination of a receptacle, a filtering unit adapted to be mounted in said receptacle and comprising a tubular body portion of relatively pliable material shaped to provide double wall portions, a disc of relatively stiff material secured to the inner and outer free edges of said walls and a frame member mounted within the space included between the walls of said body portion and said disc.

3. In a filter of the character described the combination of a receptacle, a filtering unit adapted to be mounted in said receptacle and comprising a body portion of relatively pliable material shaped to provide annularly spaced double walls, an annular perforated disc of relatively stiff material secured to the inner and outer free edges of said body portion and a skeleton frame member of predetermined conformation mounted within the space between the walls of said body member and said disc.

4. In a filter, the combination with a receptacle of a filtration unit comprising a body portion of permeable and relatively flexible material shaped to assume a predetermined conformation including annularly spaced wall portions, having their edges terminating in the same plane, an annular and relatively non-flexible disc secured to the inner and outer edges of said wall portions, and a rigid frame member inserted and secured within the space between said wall portions and said disc.

5. In a filter of the character described. the combination of a receptacle, a filtering unit adapted to be removably mounted in said receptacle, and comprising a screen of relatively flexible material adapted to assume an annular shape, and conical in section, a frame structure of like conformation forming a skeleton on which said screen is mounted, and an annular baffle member secured at the central portion of the base of said screen.

6. In a filter of the character described, the combination of a receptacle comprising a body member, a cap member closing the end of said body member, and including a stem extending axially of said body member, and a filtration unit adapted to be mounted in said body member and comprising an annular screen having a central opening through which said stem extends, and conical in section, a skeleton frame within said screen, and acting to maintain the same in its predetermined conformation, and an annular baffle member extending axially of said screen, and fixed at the base edge of the inner wall portion thereof.

7. In a gasoline filter for internal combustion motors, the combination of a receptacle comprising an open jar, a cap fitting over the top of said jar, a filtering member seating about the top of said jar with its outer edge spaced inwardly from the outer edge of the top of said jar, a gasket interposed between said cap, the top of said jar and said outer edge of the filtering member, and means for drawing said cap and jar together to form a liquid tight seal between said gasket, the top of said jar and the outer edge of said filtering member.

8. In a gasoline filter for internal combustion motors, the combination of a receptacle comprising an open jar provided with an annular recess about its top edge, a cap fitting over the jar, a filtering member seating at its edge in said recess. a gasket between said cap and the edges of said jar and filtering member, and means for drawing said cap, filtering member and jar together in liquid tight sealing engagement with said gasket.

9. In a gasoline filter for internal combustion motors, the combination of a jar having a recess about its top edge, a filter member having an outside diameter less than the outside diameter of the top edge of said jar and adapted to seat at its edge in said recess, a cap fitting over said jar, a gasket between said cap and top edge of said jar and extending radially inward to include the edge of said filter member, and means for drawing said cap and jar together.

10. In a gasoline filter for internal combustion motors, the combination of a receptacle comprising an open jar, a cap fitting over said jar, a filtering member comprising a disc seating at its edge around the top of said jar, a gasket fitting between said cap and the top of said jar and the edge of said disc, and means for drawing said cap, disc and jar together in liquid tight sealing engagement with said gasket.

11. In a gasoline filter, for internal combustion motors, the combination of a receptacle comprising an open jar having an annular recess about its top edge, a cap fitting over the top of said jar and having a marginal flange forming a downwardly facing shoulder, a filtering member comprising a disc seating at its edge in said recess about the top of said jar, a gasket fitting in the shoulder of said cap and bearing upon the contacting edges of said jar and disc, and means for drawing said cap and jar together.

12. In a gasoline filter, for internal combustion motors, the combination of a receptacle comprising an open jar, a cap fitting over the top of said jar and having a marginal flange forming a downwardly facing shoulder, a filtering member seating at its edge about the top of said jar, a gasket fitting in the shoulder of said cap and bearing upon the contacting edges of said jar and filtering member, and adjustable pressure means connected with said cap and bearing against the bottom of said jar.

13. In a gasoline filter for internal combustion motors, the combination of a receptacle comprising an open jar, a cap fitting over the top of said jar and having a tubular stem extending axially into said jar, a filtering member seating at its edge about the top of said jar and provided with a central opening adapted to receive said tubular stem in sealing engagement therewith, a gasket located between said cap and the contacting edges of said jar and filtering member, and means for drawing said cap and jar together in liquid tight sealing contact with said gasket.

14. In a gasoline filter for internal combustion motors, the combination of a receptacle comprising an open jar having an annular recess in its top edge forming an inwardly facing shoulder, a cap fitting over the top of said jar and having a tubular stem depending axially therefrom, a filtering unit removably mounted in said receptacle and including a disc seating at its edge in said shoulder around the top of said jar and provided with a central opening adapted to receive said tubular stem in liquid tight sealing contact therewith, a single gasket between said cap and the contacting edges of said jar and disc, said cap having inlet and outlet connections, one communicating with the space below said disc through said stem and the other with the space above said disc, and means for drawing said cap, disc and jar together in liquid tight sealing contact at said gasket.

15. In a gasoline filter for internal combustion motors, the combination of a receptacle comprising an open jar, a cap fitting over the top of said jar and provided with a tubular stem extending axially into said jar, a filtering unit including a disc having seating engagement in an annular recess about the top edge of said jar and provided with a central opening and a screen of filtering material depending from said disc and enclosing a portion of the space in said jar below said disc, said stem being adapted to extend through said central opening in said disc and to communicate with the space therebelow and on one side of said screen, said cap having inlet and outlet connections, one connected with said tubular stem and the other with the space above said disc and on the opposite side of said screen, and means for holding said cap, jar and filter unit in liquid tight contact including a single gasket between said cap and the edges of said jar and disc.

16. In a gasoline filter for internal combustion motors, the combination of a jar having a recess about its top edge thereby forming a shoulder in a plane parallel to the top edge of the jar, a filter member having an outside diameter less than the outside diameter of said recess and adapted to seat at its edge in said recess, a cap fitting over said jar, a gasket of cork-like material between said cap and the top edge of said jar and extending radially inward to include the edge of said filter member, and means for drawing said cap and jar together.

17. In a gasoline filter for internal combustion motors, the combination of a jar having an internal shoulder parallel to and spaced a short distance below the top edge of the jar, a filter member having an outside diameter less than the internal diameter of said jar above said shoulder and seating upon said shoulder, a cap fitting over said jar, a cork-like gasket between said cap, the top of said jar and said filter member, and means for drawing said cap and jar together, the gasket thereby forming a seal between the cap and the filter member.

In witness whereof, I hereunto subscribe my name this 7th day of December, A. D., 1920.

WILLIAM FELL.